US005612271A

United States Patent [19]

Zandona

[11] Patent Number: 5,612,271
[45] Date of Patent: Mar. 18, 1997

[54] PROCESS FOR THE PREPRATION OF A CATALYTIC SYSTEM, PROCESS FOR THE (CO)POLYMERIZATION OF OLEFINS AND (CO)POLYMERS OF AT LEAST ONE OLEFIN

[75] Inventor: Nicola Zandona, Waterloo, Belgium

[73] Assignee: Solvay (Société Anonyme), Brussels, Belgium

[21] Appl. No.: 71,067

[22] Filed: Jun. 4, 1993

[30] Foreign Application Priority Data

Jun. 5, 1992 [BE] Belgium ................................ 09200526

[51] Int. Cl.$^6$ ........................................................ B01J 31/00
[52] U.S. Cl. ........................... 502/117; 502/103; 502/104; 502/152; 502/158
[58] Field of Search ............................ 502/103, 104, 502/117, 152, 158

[56] References Cited

U.S. PATENT DOCUMENTS 4,701,432 10/1987 Welborn, Jr. et al. .................. 502/117
5,171,799 12/1992 Kioka et al. ............................ 502/117
5,240,844 8/1993 Burkhardt et al. ...................... 502/117
5,252,529 10/1993 Ueda et al. ............................. 502/117

FOREIGN PATENT DOCUMENTS

0426638A2  5/1991  European Pat. Off. .
0500944A1  9/1992  European Pat. Off. .
WO92/01723 2/1992  WIPO .

*Primary Examiner*—Glenn A. Caldarola
*Assistant Examiner*—Elizabeth D. Wood
*Attorney, Agent, or Firm*—Spencer & Frank

[57] ABSTRACT

Process for the preparation of a catalytic system according to which a mixture of a halogenated neutral metallocene derived from a transition metal chosen from groups IIIB, IVB, VB and VIB of the Periodic Table and of an organoaluminium compound is prepared and an ionising agent is added thereto. (Co)polymerization process according to which a mixture of a halogenated neutral metallocene as defined above and of an organoaluminium compound is prepared, the olefin is brought into contact with this mixture and an ionising agent is added thereto.

19 Claims, No Drawings

PROCESS FOR THE PREPRATION OF A CATALYTIC SYSTEM, PROCESS FOR THE (CO)POLYMERIZATION OF OLEFINS AND (CO)POLYMERS OF AT LEAST ONE OLEFIN

FIELD OF THE INVENTION

The present invention relates to a process for the preparation of an ionic catalytic system, starting from a neutral metallocene derived from a transition metal, which is optionally supported, for example on silica, from an organoaluminium compound and from an ionising agent. The invention also relates to a process for the (co)polymerisation of olefins, typically of ethylene and of propylene.

TECHNOLOGY REVIEW

Patent Application EP-426,638 (Fina Technology Inc.) discloses a process for the polymerisation of olefins according to which, in the first stage, the olefin is mixed with an alkylaluminium compound and, in a second stage, a catalyst is added thereto. According to this known process, the catalyst is obtained by mixing an ionising agent such as triphenylcarbeniumtetrakis(pentafluorophenyl)borate with a neutral metallocene derived from a transition metal and selected from cyclopentadiene, indene and fluorene derivatives. Although halogenated metallocenes are mentioned, only nonhalogenated dimethylated metallocenes are explicitly described in the examples.

Nonhalogenated polymethylated metallocenes are generally unstable products obtained by a laborious synthesis. Moreover, it has been observed that catalysts manufactured from nonhalogenated polymethylated metallocenes are particularly unstable and exhibit, during their use for polymerising olefins, an activity which decreases rapidly from the moment of their preparation. This behaviour makes these catalysts difficult to reproduce and consequently inefficient in the polymerisation of olefins.

SUMMARY OF THE INVENTION

The invention overcomes the disadvantages of the known process described above by providing a new process which makes it possible to produce ionic catalytic systems prepared starting from metallocenes (optionally supported), avoiding the use of unstable nonhalogenated polymethylated metallocenes and thus circumventing their laborious synthesis. Another object of the invention is to provide catalytic systems prepared in situ in the polymerisation reactor, thus simplifying the polymerisation process by removing the prior stage for the generation of the ionic metallocene.

DETAILED DESCRIPTION OF THE INVENTION

Consequently, the invention relates to a process for the preparation of a catalytic system according to which there is used at least one organoaluminium compound of general formula AlTT'T", in which T, T' and T" each denote a hydrocarbon radical which can optionally comprise oxygen, at least one neutral metallocene derived from a transition metal and at least one ionising agent; according to the invention, the neutral metallocene is selected from compounds of formula $(C_p)_a(C_p')_b MX_x Z_z$, in which:

$C_p$ denotes an unsaturated hydrocarbon radical coordinated to the central atom M $C_p'$ denotes an unsaturated hydrocarbon radical coordinated to the central atom M, or a radical derived from an element chosen from groups VA and VIA of the Periodic Table, the groups $C_p$ and $C_p'$ being identical or different, and being able to be linked via a covalent bridge M denotes a transition metal chosen from groups IIIB, IVB, VB and VIB of the Periodic Table a, b, x and z denote integers such that $(a+b+x+z)=m$, $x \geq 1$, $z \geq 0$ and a and/or $b \neq 0$ m denotes the valency of the transition metal M X denotes a halogen Z denotes a hydrocarbon radical which can optionally comprise oxygen or a silyl radical of formula ($-R_t-Si-R'R''R'''$), where R denotes an optionally substituted alkyl, alkenyl, aryl, alkoxy or cycloalkyl group R', R" and R'" are identical or different and each denote a halogen or an optionally substituted alkyl, alkenyl, aryl, alkoxy or cycloalkyl group t denotes 0 or 1 and, in a first stage, a mixture of the organoaluminium compound and of the neutral metallocene in at least one hydrocarbon diluent is prepared and, in a second stage, the ionising agent is added thereto.

In the process according to the invention, the organoaluminium compounds of general formula AlTT'T" may be chosen from trialkylaluminium compounds such as tributyl-, trimethyl-, triethyl-, tripropyl-, triisopropyl-, triisobutyl-, trihexyl-, trioctyl- and tridodecylaluminium. The preferred organoaluminium compounds are those in which the hydrocarbon radicals are chosen from optionally substituted alkyl, alkenyl, aryl and alkoxy groups containing up to 20 carbon atoms. The most advantageous organoaluminium compounds are triethylaluminium and triisobutylaluminium.

The compounds of formula $(C_p)_a(C_p')_b MX_x Z_z$ used in the preparation process according to the invention are advantageously those in which the transition metal is selected from scandium, titanium, zirconium, hafnium and vanadium. Zirconium is particularly well suited. The groups $C_p$ and $C_p'$ each advantageously represent an optionally substituted mono- or polycyclic group, comprising from 5 to 50 carbon atoms, linked via conjugated double bonds. There may be mentioned, as a typical example, the cyclopentadienyl, indenyl or fluorenyl radical or a substituted derivative of this radical. The preferred substituted radicals are those in which at least one hydrogen atom is substituted by a hydrocarbon radical comprising up to 10 carbon atoms. It may also be a radical derived from an element chosen from groups VA and VIA of the Periodic Table, for example nitrogen.

In the preparation process according to the invention, the neutral organic derivatives of formula $(C_p)_a(C_p')_b MX_x Z_z$, in the case where z is equal to 0, may, for example, be chosen from mono- and dihalogenated metallocenes of scandium, such as chlorodi(cyclopentadienyl)scandium and dichloro(indenyl)scandium, mono-, di- and trihalogenated metallocenes of titanium, such as chlorotri(pentamethylcyclopentadienyl)titanium, dibromodi(methylcyclopentadienyl)titanium and trichloro(cyclopentadienyl)titanium, mono-, di- and trihalogenated metallocenes of zirconium, such as iodotri(cyclopentadienyl)zirconium, dibromo(cyclopentadienyl-indenyl)zirconium and trichloro(fluorenyl)zirconium, mono-, di- and trihalogenated metallocenes of hafnium, mono-, di- and trihalogenated metallocenes of vanadium, such as chlorotri(cyclopentadienyl)vanadium, dichlorodi(ethylcyclopentadienyl)vanadium and trichloro(ethylindenyl)vanadium, or mono- and dihalogenated trivalent metallocenes of chromium, such as dichloro(cyclopentadienyl)chromium.

In the case where z is other than 0 and where Z is a hydrocarbon radical, the neutral metallocenes of formula $(C_p)_a(C_p')_bMX_xZ_z$ may, for example, be chosen from chloro(cyclopentadienyl)ethylscandium, dibromo(methylcyclopentadienyl)butyltitanium, chloro(indenyl)isopropyltitanium or dichloro(fluorenyl)hexylzirconium.

In the case where z is other than 0 and where Z is a silyl radical of formula ($-R_r13$ Si$-$R'R"R'''), the neutral metallocenes of formula $(C_p)_a(C_p')_bMX_xZ_z$ may, for example, be chosen from those comprising, as silyl radical, allyldimethylchlorosilyl, allylmethyldiethoxysilyl, 5-(bicycloheptenyl)trichlorosilyl, 2-bromo-3-trimethylsilyl-1-propenyl, 3-chloropropyldimethylvinylsilyl, 2-(3-cyclohexenyl)ethyltrimethoxysilyl and diphenylvinylchlorosilyl.

The metallocenes having a covalent bridge connecting the two $C_p$ and $C_p'$ groups may be chosen from those of general formula

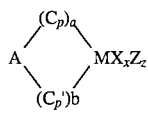

in which A represents an optionally halogenated alkylene, which can optionally comprise oxygen, alkenylene, arylalkylene, alkylarylene or arylalkenylene group or a radical derived from an element chosen from groups IIIA, IVA, VA and VIA of the Periodic Table, such as boron, aluminium, silicon, germanium, tin, nitrogen, phosphorus and sulphur. There may be mentioned, as examples of bridged metallocenes, those corresponding to the formulae:

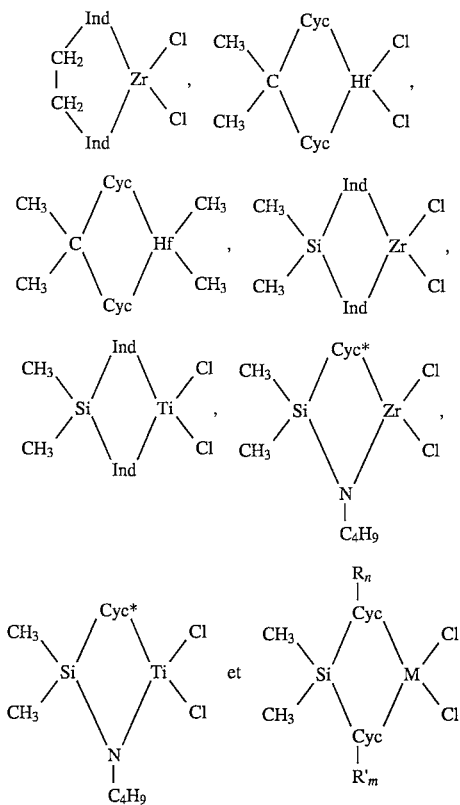

in which Ind represents the indenyl radical, Cyc represents the cyclopentadienyl radical, Cyc* represents the pentamethylcyclopentadienyl radical, R and R' represent an alkyl group, n and m represent a number from 1 to 5, and M represents titanium, zirconium or hafnium.

The preferred metallocenes of formula $(C_p)_a(C_p')_bMX_xZ_z$ are those in which $C_p$ and $C_p'$ are chosen from cyclopentadienyl, indenyl and fluorenyl radicals. Good results are obtained with those in which the groups $C_p$ and $C_p'$ are linked by a covalent bridge of the alkyl type. The metallocenes in which the transition metal is chosen from titanium, zirconium and hafnium are particularly well suited. Particularly satisfactory results are obtained with the metallocenes derived from zirconium.

In the process according to the invention, ionising agent is understood to denote a compound comprising a first part which has the properties of a Lewis acid and which is capable of ionising the neutral metallocene and a second part which is inert with respect to the ionised metallocene and which is capable of stabilising the ionised metallocene. The ionising agent may be an ionic compound comprising a cation having the properties of a Lewis acid and an anion constituting the abovementioned second part of the ionising agent. Artions which have led to very good results are the organoborates. Organoborate is understood to denote a boron derivative in which the boron atom is linked to 4 organic substituents. There may be mentioned, as examples of ionic ionising agents, triphenylcarbenium tetrakis(pentafluorophenyl)borate, N,N-dimethylanilinium tetrakis(pentafluorophenyl)borate and tri(n-butyl)ammonium tetrakis(pentafluorophenyl)borate. The preferred cationic Lewis acids are carbenium, sulphonium and oxonium.

In a variant, the ionising agent may also be a nonionic compound, having the properties of a Lewis acid which is capable of converting the neutral metallocene to a cationic metallocene. To this end, the ionising agent is itself converted to an anion, inert with respect to the cationic metallocene, which is capable of stabilising the latter. There may be mentioned, as examples of nonionic ionising agents, tri(pentafluorophenyl)borane, triphenylborane, trimethylborane, tri(trimethylsilyl)borane and the organoboroxines.

The ionising agent is preferably selected from triphenylcarbeniumtetrakis(pentafluorophenyl)borate and tri(pentafluorophenyl)borane.

The first stage of the preparation process according to the invention consists in preparing a mixture of the organoaluminium compound and the neutral metallocene in at least one hydrocarbon diluent in order to substitute at least one of the halogens of the neutral metallocene by a hydrocarbon radical. The hydrocarbon diluent used in this stage may be chosen from aliphatic hydrocarbons such as linear alkanes (for example n-butane, n-hexane and n-heptane), branched alkanes (for example isobutane, isopentane, isooctane and 2,2-dimethylpropane) or cycloalkanes (for example cyclopentane and cyclohexane), from monocyclic aromatic hydrocarbons such as benzene and its derivatives, for example toluene, and from polycyclic aromatic hydrocarbons, it being possible for each ring to be substituted. It is possible, of course, to use a number of hydrocarbon diluents simultaneously. Toluene is well suited.

The respective amounts of the organoaluminium compound and of the neutral metallocene depend on the choice of these compounds. In practice, it is advantageous to use the organoaluminium compound in a sufficient amount to substitute all the halogen atoms of the neutral metallocene. It may be advantageous to use larger amounts of the organoaluminium compound in order to benefit from its properties of capturing impurities during the manufacture of the catalytic system. To this end, it is recommended, for example, that the molar ratio of the organoaluminium compound to the neutral metallocene is at least equal to 10. In order to also benefit from the abovementioned properties of the organoaluminium compound during use of the catalytic system in an olefin polymerisation process, it is recommended that the molar ratio of the organoaluminium compound to the neutral metallocene is at least equal to 100, for example approximately 1000.

In this first stage of the preparation process according to the invention, the mixture is prepared at a temperature which can vary from room temperature to the boiling temperature of the most volatile compound of the mixture at the working pressure, while remaining below the thermal decomposition temperature of the components of the mixture. The temperature consequently depends on the nature of the components of the mixture and is generally greater than 15° C., preferably at least equal to 20° C. It is commonly at most equal to 80° C., preferably below 70° C. Room temperature is particularly well suited.

The duration of this first stage must be sufficient to make possible complete reaction of the metallocene of the organoaluminium compound. It may vary from a few seconds to several hours. In practice, there is no advantage in postponing the second stage, the reaction in the first stage being generally instantaneous. The mixture may be stirred throughout the duration of the first stage or for part of the latter.

The mixture prepared during the first stage of the process according to the invention may comprise more than one organoaluminium compound and more than one neutral metallocene.

In the second stage of the process according to the invention, the ionising agent is added to the mixture obtained in the abovementioned first stage.

In the second stage of the process according to the invention, the ionising agent is preferably to be used in an amount sufficient to ionise the metallocene. The amount of ionising agent to be used will consequently depend on the neutral metallocene and on the ionising agent selected. In general, it is possible to use an amount of ionising agent such that the molar ratio of the ionising agent to the neutral metallocene used in the abovementioned first stage is at least equal to 0.1, in particular at least equal to 0.5, the values lower than 10 being preferred and those lower than 2 being recommended.

This second stage of the process according to the invention may be carried out at any temperature lower than the boiling temperature of the most volatile compound of the reaction mixture at the working pressure. Reaction mixture is understood to denote the mixture obtained after addition of the ionising agent during the second stage of the process according to the invention. The temperature is generally greater than −50° C., preferably at least equal to 0° C.; it is commonly lower than 100° C., preferably at most equal to 80° C. Room temperature is particularly well suited.

The duration of this second stage must be sufficient to make possible complete ionisation of the product of the reaction between the neutral metallocene and the organoaluminium compound obtained in the abovementioned first stage. It may vary from a few seconds to several hours. The reaction being generally instantaneous, durations varying from 0.5 to 30 minutes are the most common. The reaction mixture may be stirred throughout the duration of the second stage or for a part of the latter.

In this second stage of the process according to the invention, it is possible to add more than one ionising agent to the mixture resulting from the first stage.

In a first embodiment of the process according to the invention, the neutral metallocene is used in the solid form. This implies that the hydrocarbon diluent used in the first stage of the process according to the invention must be such that the neutral metallocene is soluble therein. To this end, it is possible, for example, to use as hydrocarbon diluent any aromatic hydrocarbon. Toluene is well suited. In this embodiment, the amount of hydrocarbon diluent used must be sufficient to make it possible to completely dissolve the neutral metallocene therein. The amount of hydrocarbon diluent consequently depends on its nature, on the nature of the neutral metallocene and on the temperature at which the first stage of the process according to the invention is carried out.

In a variant of this first embodiment of the process according to the invention which is preferred, the neutral metallocene is used in the form of a solution. To this end, it is dissolved beforehand in an aromatic hydrocarbon, preferably toluene. In this variant, the choice of hydrocarbon diluent used in the first stage of the process according to the invention is independent of the nature of the neutral metallocene. Consequently, it is possible to use as hydrocarbon diluent the aromatic and aliphatic hydrocarbons mentioned above. The preferred hydrocarbon diluents are aromatic hydrocarbons. Toluene is well suited.

A second embodiment of the process according to the invention consists in using the ionising agent in the solid form. In this second embodiment, the choice of the hydrocarbon diluent used during the first stage must be such that the ionising agent is soluble therein. Hydrocarbon diluents capable of dissolving the ionising agent must be selected from aromatic hydrocarbons, such as toluene, and halogenated aliphatic hydrocarbons, such as methylene chloride and chloroform. Toluene is well suited. In this embodiment, the amount of the hydrocarbon diluent used must be sufficient to make it possible to completely dissolve the ionising agent therein. The amount of the hydrocarbon diluent consequently depends on its nature, on the nature of the ionising agent and on the temperature at which the second stage of the process according to the invention is carried out.

In a variant of this second embodiment, the ionising agent is used in the form of a solution. To this end, it is dissolved beforehand in an aromatic hydrocarbon, such as toluene, or in a halogenated aliphatic hydrocarbon, such as methylene chloride and chloroform. In this variant, the choice of the hydrocarbon diluent used during the first stage of the process according to the invention does not depend on the nature of the ionising agent. Consequently, the hydrocarbon diluent may be chosen from the aromatic and aliphatic hydrocarbons mentioned above.

In a third embodiment of the process according to the invention, the neutral metallocene is deposited on a support, which may be a polymer (such as, for example, polyethylene, polypropylene and their copolymers) or an inorganic support. To this end, the support, optionally activated beforehand by any known means, is impregnated with a solution of the neutral metallocene. The solution may be prepared as in the variant of the first embodiment of the process according to the invention, explicitly described above. An inorganic support is preferably used. There may be mentioned, as examples of inorganic supports, inorganic oxides such as oxides of silicon, aluminium, titanium, zirconium or thorium (optionally treated with a fluorinated compound), their mixtures and the mixed oxides of these metals, such as aluminium silicate and aluminium phosphate, and inorganic halides such as magnesium chloride. Silica, alumina and magnesium chloride are preferred. The operating temperature of the impregnation may vary from room temperature to the boiling temperature of the solution of the neutral metallocene and the duration of the impregnation may vary from a few minutes to several hours. In this embodiment of the process according to the invention, the support impregnated with the neutral metallocene is collected from the solution, then dispersed in the hydrocarbon diluent and mixed with the organoaluminium compound during the first stage explicitly described above.

In a variant of this third embodiment of the process according to the invention, the support is treated with an alumoxane solution. The support may be a polymer or an inorganic support. An inorganic support is preferably used. The alumoxane may be chosen from the linear compounds of formula:

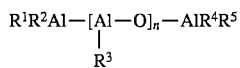

and the cyclic compounds of formula:

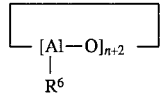

in which $R^1$, $R^2$, $R^3$, $R^4$, $R^5$ and $R^6$ each represent an alkyl group containing up to 18 carbon atoms, preferably up to 12 carbon atoms, and $2 \leq n \leq 50$. Methylalumoxane is preferably used. The alumoxane is dissolved in an organic solvent chosen from aliphatic hydrocarbons such as linear alkanes, branched alkanes and cycloalkanes, from monocyclic aromatic hydrocarbons such as benzene and its derivatives, for example toluene, from polycyclic aromatic hydrocarbons in which each ring may be substituted and from their mixtures. The preferred organic solvents are aromatic hydrocarbons. Toluene is particularly well suited. The operating temperature of the treatment with the alumoxane solution may vary from room temperature to the boiling temperature of the organic solvent and the duration of impregnation may vary from a few minutes to several hours, for example 5 minutes to 6 hours. In this variant, impregnation of the inorganic support with the solution of the neutral metallocene may be carried out before or after having treated the inorganic support with the alumoxane solution. It is preferable to treat the inorganic support with the alumoxane solution before impregnating it with the solution of the neutral metallocene.

In a fourth embodiment of the process according to the invention, the ionising agent is deposited on a support. To this end, the support, optionally activated beforehand by any known means, is impregnated with a solution of the ionising agent. The solution may be prepared as in the variant of the second embodiment of the process according to the invention, explicitly described above. The support may be a polymer or an inorganic support, and is in accordance with that used as support of the neutral metallocene explicitly described above. An inorganic support is preferably used. The operating conditions of the impregnation are in accordance with those described in the third embodiment of the process according to the invention.

In a fifth embodiment of the process according to the invention, a neutral metallocene of formula $(C_p)_a(C_p')_bMX_x(-R_t-Si-R'R''R''')_z$ is used which was prepared by reacting a silane with a compound of formula $(C_p)_a(C_p')_bMX_xH_z$ (where the symbols $C_p$, $C_p'$, M, X, a, b, x and z have the same meaning as that given above with the exception of z which is other than 0). This reaction preferably takes place in a suitable solvent. Compounds of formula $(C_p)_a(C_p')_bMX_xH_z$ which have led to very good results are especially those derived from zirconium, titanium and hafnium in which $C_p$ and $C_p'$ are chosen from cyclopentadienyl, indenyl and fluorenyl radicals optionally linked via a covalent bridge of the alkyl type. Those derived from zirconium are preferably used. As examples of silanes which can be used in this embodiment, there may be mentioned allyldimethylchlorosilane, allylmethyldiethoxysilane, 5-(bicycloheptenyl)trichlorosilane, 2-bromo-3-trimethylsilyl-1-propene, 3-chloropropyldimethylvinylsilane, 2-(3-cyclohexenyl)ethyltrimethoxysilane, diphenylvinylchlorosilane, vinyltriphenoxysilane, vinyltrichlorosilane, 2-(trimethylsilylmethyl)-1,3-butadiene and 3-(trimethylsily)cyclopentene. The preferred silanes are nonhalogenated alkenylsilanes comprising up to 60 carbon atoms, such as allyltriethoxysilane, allyltrimethylsilane, 5-(bicycloheptenyl)triethoxysilane, vinyl(trimethoxy)silane and 2-(3-cyclohexenyl)ethyltrimethoxysilane. Vinyl(trimethoxy)silane is particularly well suited. The solvent of the reaction between the silane and the compound of formula $(C_p)_a(C_p')_bMX_xH_z$ is advantageously an aromatic hydrocarbon, preferably toluene. The temperature at which this reaction is carried out may vary from room temperature up to the boiling temperature of the solvent used, for example from 20° to 100° C. The preferred temperature is room temperature.

In a sixth embodiment of the process according to the invention, a neutral metallocene of formula $(C_p)_a(C_p')_bMX_xZ_z$ (where the symbols $C_p$, $C_p'$, M, X, a, b, x and z have the same meaning as that given above, z being other than 0 and Z being a hydrocarbon radical) is used which was prepared by reacting a compound of formula $(C_p)_a(C_p')_bMX_xH_z$, as defined above, with an olefin. This reaction preferably takes place in a suitable solvent. The compounds of formula $(C_p)_a(C_p')_bMX_xH_z$ are in accordance with those used in the fifth embodiment. Olefins which can be used in this embodiment advantageously contain up to 20 carbon atoms, preferably up to 12 carbon atoms, and may be chosen from mono-olefins such as ethylene and 3-ethyl-1-butene, nonconjugated diolefins such as 1,5-hexadiene, conjugated diolefins such as 1,3-pentadiene and alicyclic diolefins such as dicyclopentadiene. The preferred olefin is ethylene. The solvent of the reaction between the olefin and the compound of formula $(C_p)_a(C_p')_bMX_xH_z$ is advantageously an aromatic hydrocarbon, preferably toluene. The temperature at which this reaction is carried out may vary from room temperature up to the boiling temperature of the solvent used, for example from 20° to 100° C. The preferred temperature is room temperature.

In a seventh embodiment of the process according to the invention, the catalytic system resulting from the second stage is deposited on a support. To this end, the support, optionally activated beforehand by any known means, is impregnated with a solution of the catalytic system. The solution is preferably that obtained in the second stage of the process according to the invention. The support, which may be a polymer or an inorganic support, and the operating conditions of the impregnation are in accordance with that which was described in the third embodiment of the process according to the invention. An inorganic support is preferably used.

The process according to the invention makes it possible to obtain ionic catalytic system, optionally starting from supported metallocenes, and has the advantageous characteristic of avoiding the use of unstable nonhalogenated polymethylated metallocenes and additionally of eliminating the laborious synthesis of these metallocenes. The process according to the invention also makes it possible to manufacture catalytic systems starting from metallocene hydrides of formula $(C_p)_a(C_p')_bMX_xH_z$ in which z is other than 0, which are generally difficult to handle because of their polymeric nature and the difficulty of solubilising them economically.

The catalytic systems obtained by means of the process according to the invention may be used for the homopolymerisation and the copolymerisation of olefins containing up to 20 carbon atoms per molecule. The olefins advantageously contain from 2 to 12 carbon atoms per molecule and are, for example, chosen from ethylene, propylene, 1-butene, 1-pentene, 3-methyl-1-butene, 1-hexene, the 3- and 4-methyl-1-pentenes, 1-octene, 3-ethyl-1-butene, 1-heptene, 3,4-dimethyl-1-hexene, 4-butyl-1-octene, 5-ethyl-1-decene and 3,3-dimethyl-1-butene and vinyl monomers such as styrene and vinyl chloride. The catalytic systems according to the invention find a specific use in the production of homopolymers of ethylene and of propylene, or of copolymers of ethylene and of propylene with each other and/or with one or a number of olefinically unsaturated comonomers which can comprise up to 8 carbon atoms, for example 1-butene, 1-pentene, 3-methyl-1-butene, 1-hexene, the 3- and 4-methyl-1-pentenes and 1-octene. One or a number of diolefins comprising from 4 to 18 carbon atoms may also be copolymerised with ethylene and propylene. The diolefins are preferably chosen from nonconjugated aliphatic diolefins such as 4-vinylcyclohexene and 1,5-hexadiene, alicyclic diolefins having an endocyclic bridge such as dicyclopentadiene, or methylene- and ethylidenenorbornene, and conjugated aliphatic diolefins such as 1,3-butadiene, isoprene and 1,3-pentadiene.

The catalytic systems obtained by means of the process according to the invention appear particularly outstanding for the manufacture of homopolymers of ethylene and of propylene and of copolymers of ethylene or of propylene containing at least 90%, preferably at least 95%, by weight of ethylene or propylene. The preferred comonomers of ethylene are propylene, 1-butene, 1-hexene, 1-octene and 1,5-hexadiene and those of propylene are ethylene, 1,3-butadiene and 1,5-hexadiene.

The invention also relates to a process for the (co)polymerisation of at least one olefin in the presence of a catalytic system comprising at least one organoaluminium compound of general formula AlTT'T", in which T, T' and T" each denote a hydrocarbon radical which can optionally comprise oxygen, at least one neutral metallocene derived from a transition metal and at least one ionising agent; according to the invention, the neutral metallocene is selected from compounds of formula $(C_p)_a(C_p')_bMX_xZ_z$, in which:

$C_p$ denotes an unsaturated hydrocarbon radical coordinated to the central atom M $C_p'$ denotes an unsaturated hydrocarbon radical coordinated to the central atom M, or a radical derived from an element chosen from groups VA and VIA of the Periodic Table, the groups $C_p$ and $C_p'$ being identical or different, and being able to be linked via a covalent bridge M denotes a transition metal chosen from groups IIIB, IVB, VB and VIB of the Periodic Table a, b, x and z denote integers such that (a+b+x+z)=m, x≧1, z≧0 and a and/or b≠0 m denotes the valency of the transition metal M

X denotes a halogen

Z denotes a hydrocarbon radical which can optionally comprise oxygen or a silyl radical of formula (—$R_t$—Si—R'R"R'"), where R denotes an optionally substituted alkyl, alkenyl, aryl, alkoxy or cycloalkyl group R', R" and R'" are identical or different and each denote a halogen or an optionally substituted alkyl, alkenyl, aryl, alkoxy or cycloalkyl group t denotes 0 or 1 and a mixture of the organoaluminium compound and of the neutral metallocene in at least one hydrocarbon diluent is prepared, the olefin is brought into contact with this mixture and the ionising agent is added thereto.

In the (co)polymerisation process according to the invention, the organoaluminium compound, the neutral metallocene, the ionising agent and the hydrocarbon diluent are in accordance with those used in the process for the preparation of the catalytic system explicitly described above. Isobutane or hexane is preferably used as the hydrocarbon diluent. Isobutane is particularly well suited.

In the (co)polymerisation process according to the invention, the olefin is in accordance with that defined above, which can be polymerised in the presence of the catalytic systems obtained by means of the process according to the invention.

In the (co)polymerisation process according to the invention, the preparation of the mixture of the organoaluminium compound and of the neutral metallocene and the addition of the ionising agent are carried out respectively as in the abovementioned first and second stage of the process for the preparation of the catalytic system and are characterised in that they are carried out in the polymerisation reactor.

In a specific embodiment of the (co)polymerisation process according to the invention, the neutral metallocene and/or the ionising agent is deposited on a support. To this end, the support is impregnated with a solution of the neutral metallocene (respectively of the ionising agent) as described in the third (respectively the fourth) embodiment of the preparation process according to the invention. The support, which may be a polymer or an inorganic support, is in accordance with that used in these embodiments. An inorganic support is preferably used.

In the (co)polymerisation process according to the invention, the polymerisation may be carried out without distinction in solution, in suspension or in the gas phase and may be carried out continuously or noncontinuously, for example by carrying out a prepolymerisation in suspension in a first reactor followed by a gas phase polymerisation in a second reactor. A molecular weight regulator, such as hydrogen, may optionally be used in the (co)polymerisation.

In the case of a suspension (co)polymerisation, the latter is carried out in the hydrocarbon diluent used in the preparation of the mixture of the neutral metallocene and of the organoaluminium compound and at a temperature such that at least 50% (preferably at least 70%) of the (co)polymer formed is insoluble therein. The temperature is generally at least equal to 20° C., preferably at least 50° C.; it is commonly at most equal to 200° C., preferably at most 100° C. The olefin partial pressure is most often at least equal to atmospheric pressure, preferably ≧0.4 MPa, for example ≧0.6 MPa; this pressure is generally at most equal to 5 MPa, preferably ≦2 MPa, for example ≦1.5 MPa.

In the case of a solution (co)polymerisation, the latter may be carried out in the hydrocarbon diluent mentioned above. The operating temperature depends on the hydrocarbon diluent used and must be greater than the dissolution temperature of the (co)polymer in the latter, so that at least 50% (preferably at least 70%) of the (co)polymer is dissolved therein. Moreover, the temperature must be sufficiently low to prevent thermal degradation of the (co)polymer and/or of the catalytic system. Generally, the optimum temperature is from 100° to 200° C. The olefin partial pressure is most often at least equal to atmospheric pressure, preferably ≧0.4 MPa, for example ≧0.6 MPa; this pressure is generally at most equal to 5 MPa, preferably ≧2 MPa, for example ≧1.5 MPa. In a variant, the (co)polymerisation is carried out by using the olefin itself as the hydrocarbon diluent. In this variant, it is possible to use an olefin which is liquid under normal pressure and temperature conditions, or the reaction can be carried out under a sufficient pressure for a normally gaseous olefin to be liquefied.

In the case where (co)polymerisation is carried out in the gas phase, a gas stream comprising the olefin is brought into contact with the catalytic system in a fluidised bed. Consequently, the flowrate of the gas stream must be sufficient to keep the (co)polymer fluidised and depends on the rate of formation of the latter and on the rate at which the catalytic system is consumed. The partial pressure of the olefin may be lower than or greater than atmospheric pressure, the preferred partial pressure varying from atmospheric pressure to approximately 7 MPa. Generally, a pressure from 0.2 to 5 MPa is well suited. The choice of the temperature is not critical; the latter is generally from 30° to 200° C. It is optionally possible to use a dilution gas, which must be inert with respect to the (co)polymer.

A specific embodiment of the process according to the invention consists in copolymerising at least two olefins introduced simultaneously or at different times into the polymerisation reactor, the two olefins preferably being introduced before addition of the ionising agent.

The (co)polymerisation process according to the invention is particularly outstanding for the manufacture of homopolymers of ethylene and of propylene and of (co)polymers of ethylene and/or propylene.

The (co)polymerisation process also has the advantageous characteristic of increasing the activity of catalysts of the metallocene type deposited on an alumoxane-based support by treating the latter with an ionising agent.

The (co)polymerisation process according to the invention makes it possible to obtain (co)polymers having a low content of metallic impurities arising from the catalytic system and a low oligomer fraction. Additionally, the (co)polymerisation process makes it possible to obtain (co)polymers having a broad molecular weight distribution.

The invention consequently also relates to (co)polymers of at least one olefin having an oligomer content at most equal to 0.5% (generally lower than 0.1%) of its weight, a molecular weight distribution having a $M_w/M_n$ ratio from 2 to 10 and a transition metal content lower than 5 ppm by weight (generally than 3 ppm), $M_w$ and $M_n$ respectively denoting the weight-average molecular weight and the number-average molecular weight of the (co)polymer produced. The invention relates in particular to (co)polymers derived from ethylene and propylene, especially polyethylene and polypropylene.

EXAMPLES

The examples, the description of which follows, are used to illustrate the invention. In the first example, a catalytic system was manufactured by means of the process according to the invention, which catalytic system was then used for the polymerisation of ethylene. In Examples 2 and 4 to 12, homo- and copolymers of ethylene were manufactured, by means of the (co)polymerisation process according to the invention, by a suspension process (Examples 2 and 4 to 10) and homopolymers of propylene (Examples 11 and 12) were manufactured, by means of the (co)polymerisation process according to the invention, by a solution process. Example 3 is given by way of comparison and describes the manufacture of a catalytic system by means of the process described in the document EP-426,638 and the use of this system in the polymerisation of ethylene.

The meaning of the symbols used in these examples, the units expressing the quantities mentioned and the methods of measuring these quantities are explained below.

HLMI=flow index expressed while molten, measured under a loading of 21.6 kg at 190° C. and expressed in g/10 min according to the ASTM standard D 1238.

FO=oligomer fraction expressed in grams of oligomers per kilo of (co)polymer and measured by extraction with hexane at its boiling temperature.

<M>=transition metal M content expressed in ppm by weight and measured by X-ray fluorescence.

$M_w/M_n$=ratio of the weight-average molecular weight to the number-average molecular weight measured by steric exclusion chromatography carried out in 1,2,4-trichlorobenzene at 135° C. on a Waters type 150° C. chromatograph.

Example 1 (in accordance with the invention):
manufacture of a catalytic system and
homopolymerisation of ethylene by means of the latter (a) Preparation of the catalytic system 10 ml of toluene were mixed with 5 ml of a solution of 18 mg of ethylenebis(indenyl)dichlorozirconium in 25 ml of toluene. 3 ml of a solution of 40 g of triethylaluminium in one liter of hexane were added thereto. 5 ml of a solution of 30.5 mg of triphenylcarbenium tetrakis(pentafluorophenyl)borate in 15 ml of toluene were then introduced therein.

(b) Homopolymerisation of ethylene 1 l of isobutane and 7 ml of the solution obtained in (a), which had been prepared 67 minutes previously, were introduced into a three-liter reactor equipped with a stirrer. The temperature was brought to 40° C. The reactor was then supplied with ethylene to a partial pressure of 1 MPa. The ethylene pressure and the temperature were kept constant for the duration of the polymerisation. After 23 minutes, the reactor was cooled and degassed. 78 g of polyethylene were collected.

Example 2 (in accordance with the invention):
homopolymerisation of ethylene in the presence of
a zirconium metallocene 1 ml of a solution of 0.098 mmol of ethylenebis(indenyl)-dichlorozirconium in 50 ml of toluene and 1 ml of a 40 g/l triethylaluminium solution were introduced into a three-liter reactor equipped with a stirrer. 1 l of isobutane was then added thereto. The temperature was brought to 40° C. The reactor was then supplied with ethylene to a partial pressure of 1 MPa. 1 ml of a solution of 0.0021 mmol of triphenylcarbenium tetrakis(pentafluorophenyl)borate in 10 ml of toluene was injected into the reactor. The ethylene pressure and the temperature were kept constant during the duration of the polymerisation. After 45 minutes, the reactor was cooled and degassed. 174 g of polyethylene were collected. The polymer obtained had the following characteristics:

HLMI=2.5

FO=0

<Zr><3

$M_w/M_n$=7.1.

Example 3 (given by way of comparison): homopolymerisation of ethylene in the presence of a zirconium metallocene In this example, not in accordance with the invention, the order of introduction of the ionising agent and of the organoaluminium compound into the reactor was inverted.

A mixture was prepared, at room temperature, of 8 ml of a solution of 0.098 mmol of ethylenebis(indenyl)dichlorozirconium in 50 ml of toluene and of 8 ml of a solution of 0.0048 mmol of triphenylcarbenium tetrakis(pentafluorophenyl)borate in 25 ml of toluene. After 5 minutes, 1 ml of this mixture was introduced into a three-liter reactor which beforehand a) was supplied with one 1 of hexane and with one ml of a 40 g/l triethylaluminium solution,
b) was heated to 40° C. and
c) was supplied with ethylene to a partial pressure of 1 MPa.

The ethylene pressure and the temperature were kept constant during the duration of the polymerisation. After 45 minutes, the reactor was cooled and degassed. 42 g of polyethylene were collected. The same operations were then repeated with the following modification: 4 hours and 20 minutes were allowed to pass, instead of 5 minutes, before introducing the zirconiummetallocene/ionising agent mixture into the reactor. After 45 minutes of polymerisation, scarcely 2 g of polyethylene were collected.

A comparison of the results of Example 3 with those of Example 2 reveals the importance of the order of introduction of the reactants and the advance brought about by the invention as regards the productivity of the polymerisation process.

Example 4 (in accordance with the invention): homopolymerisation of ethylene in the presence of a hafnium metallocene 1 l of hexane, 0.20 ml of a solution of 0.128 mmol of ethylenebis(indenyl)dichlorohafnium in 50 ml of toluene and 3 ml of a 40 g/l triethylaluminium solution were introduced into a three-liter reactor equipped with a stirrer. The temperature was brought to 40° C. The reactor was then supplied with ethylene to a partial pressure of 1 MPa. 0.20 ml of a solution of 0.094 mmol of triphenylcarbenium tetrakis(pentafluorophenyl)borate in 50 ml of toluene was injected into the reactor. The ethylene pressure and the temperature were kept constant during the duration of the polymerisation. After 5 minutes, the reactor was cooled and degassed. 6 g of polyethylene were collected.

Example 5 (in accordance with the invention): homopolymerisation of ethylene in the presence of a titanium metallocene 1 l of hexane, 0.5 ml of a solution of 0.146 mmol of bis(pentamethylcyclopentadienyl)dichlorotitanium in 50 ml of toluene and 3 ml of a 40 g/l triethylaluminium solution were introduced into a three-liter reactor equipped with a stirrer. The temperature was brought to 40° C. The reactor was then supplied with ethylene to a partial pressure of 1 MPa. 0.74 ml of a solution of 0.094 mmol of triphenylcarbenium tetrakis(pentafluorophenyl)borate in 50 ml of toluene was injected into the reactor. The ethylene pressure and the temperature were kept constant during the duration of the polymerisation. After 60 minutes, the reactor was cooled and degassed. 5 g of polyethylene were collected.

Example 6 (in accordance with the invention): homopolymerisation of ethylene in the presence of a zirconium metallocene comprising a silyl radical (A) Preparation of the zirconium metallocene comprising a silyl radical 1.919 mmol of bis(cyclopentadienyl)chlorohydridozirconium were suspended in 54 ml of toluene and were then reacted at room temperature with 1.750 mmol of vinyltrimethoxysilane.

(b) Polymerisation of ethylene 1 ml of the solution obtained in (a) was introduced into a three-liter reactor, equipped with a stirrer, to which were also added 1 l of hexane and 3 ml of a 40 g/l triethylaluminium solution. The temperature was brought to 40° C. The reactor was then supplied with ethylene to a partial pressure of 1 MPa. 1 ml of a solution of 0.094 mmol of triphenylcarbenium tetrakis(pentafluorophenyl)borate in 50 ml of toluene was injected into the reactor. The ethylene pressure and the temperature were kept constant during the duration of the polymerisation. After 106 minutes, the reactor was cooled and degassed. 31 g of polyethylene were collected. The polymer obtained had the following characteristics:

HLMI<0.1
FO=0
<Zr><3
$M_w/M_n$=10.

Example 7 (in accordance with the invention): homopolymerisation of ethylene in the presence of a supported zirconium metallocene (a) Activation of the support:

3.36 g of silica were calcined at 815° C. for 16 hours under dry air and for 4 hours under nitrogen. The activated silica was suspended in 80 ml of hexane which was then treated with 4 ml of triisobutylaluminium for 2 hours at 50° C. and for 10 hours at room temperature. After evaporation of the hexane, the solid obtained was dried under vacuum and then suspended in 70 ml of toluene.

(b) Impregnation of the support:

83.3 mg of ethylenebis(indenyl)dichlorozirconium were dissolved in 50 ml of toluene and the solution thus obtained was added to the suspension obtained in (a). This mixture was stirred for 5 hours at room temperature. Then, after sedimentation of the solid, the supernatant liquid was separated off and the solid washed with toluene and hexane. The solid obtained had a zirconium content of 0.08% by weight.

(c) Polymerisation of ethylene:

57 mg of the solid obtained in (b) and 1 ml of a 40 g/l triethylaluminium solution were introduced into a three-liter reactor equipped with a stirrer. 1 l of isobutane was then added thereto. The temperature was brought to 40° C. The reactor was then supplied with ethylene to a partial pressure of 1 MPa. 2.5 ml of a solution of 0.0021 mmol of triphenylcarbenium tetrakis(pentafluorophenyl)borate in 10 ml of toluene were injected into the reactor. The ethylene pressure and the temperature were kept constant during the duration of the polymerisation. After 60 minutes, the reactor was cooled and degassed. 82 g of polyethylene were collected. The polymer obtained had the following characteristics:

HLMI=5.1
FO=0.4
<Zr><3.

Example 8 (in accordance with the invention):
homopolymerisation of ethylene in the presence of a
supported zirconium metallocene comprising a silyl
radical (a) Preparation of the zirconium metallocene comprising a silyl radical:

283.6 mg of bis(cyclopentadienyl)monochlorohydridozirconium were suspended in 50 ml of toluene, to which 0.17 ml of vinyltrimethoxysilane was added. The mixture was stirred for 5 hours until a solution was obtained.

(b) Activation of the support:

2.27 g of silica were calcined at 815° C. for 16 hours under dry air and for 4 hours under nitrogen. The activated silica was suspended in 80 ml of hexane and the suspension obtained was then treated with 4 ml of triisobutylaluminium for 2 hours at 50° C. and for 10 hours at room temperature. After evaporation of the hexane, the solid obtained was dried under vacuum and then suspended in 40 ml of toluene.

(c) Impregnation of the support:

40 ml of the solution obtained in (a) were added to the suspension obtained in (b). This mixture was stirred for 3 hours at 50° C. After sedimentation of the solid, the supernatant liquid was separated off and the solid washed with toluene. The solid obtained had a zirconium content of 0.3% by weight.

(d) Polymerisation of ethylene:

27 mg of the solid obtained in (c), 1 l of hexane and 1 ml of a 40 g/l triethylaluminium solution were introduced into a three-liter reactor equipped with a stirrer. The temperature was brought to 40° C. The reactor was then supplied with ethylene to a partial pressure of 1 MPa. 1.5 ml of a solution of 0.0048 mmol of triphenylcarbenium tetrakis(pentafluorophenyl)borate in 25 ml of toluene were injected into the reactor. The ethylene pressure and the temperature were kept constant during the duration of the polymerisation. After 15 minutes, the reactor was cooled and degassed. 30 g of polyethylene were collected.

Example 9 (in accordance with the invention):
homopolymerisation of ethylene in the presence of a
zirconium metallocene comprising a silyl radical,
deposited on a support treated with an aluminoxane (a) Activation of the support:

6.61 g of silica were calcined at 815° C. for 16 hours under dry air, for 4 hours under nitrogen and for 4 hours at 120° C. under vacuum. The activated silica was suspended in 40 ml of toluene.

(b) Treatment of the support with the aluminoxane:

The suspension obtained in (a) was treated with 15 ml of a 30% by weight solution of methylaluminoxane with stirring for 4 hours at 50° C. After evaporation of the toluene, the solid obtained was washed with toluene and then suspended in 50 ml of toluene.

(c) Preparation of the zirconium metallocene comprising a silyl radical:

128.9 mg of bis(cyclopentadienyl)monochlorohydridozirconium were suspended in 50 ml of toluene, to which 0.07 ml of vinyltrimethoxysilane was added. The mixture was stirred for 5 hours until a solution was obtained.

(d) Impregnation of the treated support:

The suspension obtained in (b) and the solution obtained in (c) were mixed and stirred for 3 hours at 50° C. After sedimentation of the solid, the supernatant liquid was separated off and the solid washed with toluene. The solid obtained had a zirconium content of 0.38% by weight.

(e) Polymerisation of ethylene:

1 ml of a 0.334M trimethylaluminium solution and 1 l of isobutane were introduced into a three-liter reactor equipped with a stirrer. The temperature was brought to 60° C. The reactor was then supplied with ethylene to a partial pressure of 1 MPa. The ethylene pressure and the temperature were kept constant during the duration of the polymerisation. 68 mg of the solid obtained in (d) were injected into the reactor. After 20 minutes, 1 ml of a solution of 29.4 mg of triphenylcarbenium tetrakis(pentafluorophenyl)borate in 15 ml of toluene was introduced therein. After 60 minutes (which corresponds to an overall polymerisation duration of 80 minutes), the reactor was cooled and degassed. 76 g of polyethylene were collected.

Example 10 (in accordance with the invention):
copolymerisation of ethylene with 1,5-hexadiene in
the presence of a zirconium metallocene 0.4 ml of a solution of 21.7 mg of ethylene-bis(indenyl)-dichlorozirconium in 25 ml of toluene and 0.5 ml of a 100 g/l triethylaluminium solution were introduced into a three-liter reactor equipped with a stirrer. 2.5 ml of 1,5-hexadiene and 1 l of isobutane were then introduced therein. The temperature was brought to 50° C. The reactor was then supplied with ethylene to a partial pressure of 1 MPa. The ethylene pressure and the temperature were kept constant during the duration of the polymerisation. 0.4 ml of a solution of 23.3 mg of triphenylcarbenium tetrakis(pentafluorophenyl)borate in 10 ml of toluene was injected into the reactor. After 45 minutes, the reactor was cooled and degassed. 112 g of copolymer were collected. The copolymer obtained had the following characteristics:

HLMI<0.1

FO=0

<Zr><3

$M_w/M_n$=10.

Example 11 (in accordance with the invention):
homopolymerisation of propylene in the presence
of a zirconium metallocene 1 ml of a 40 g/l triethylaluminium solution and 4 ml of a solution of ethylenebis(indenyl)dichlorozirconium in toluene (0.0017 mmol/ml) were introduced into a 5-liter reactor equipped with a stirrer. 3 liters of propylene at room temperature and 4 ml of a triphenylcarbenium tetrakis(pentafluorophenyl)borate solution (0.00215 mmol/ml) were added thereto. The temperature was brought to 70° C. During the polymerisation, the reactor was not supplied with propylene. After 60 minutes, the reactor was cooled and degassed. 655 g of polypropylene were collected.

Example 12 (in accordance with the invention):
homopolymerisation of propylene in the presence of a
zirconium metallocene obtained starting from a
supported ionising agent (a) Activation of the support:

1.64 g of silica were calcined at 815° C. for 16 hours under dry air, for 4 hours under nitrogen and for 4 hours at 120° C. under vacuum. The activated silica was suspended in 20 ml of toluene.

(b) Impregnation of the support:

32.0 mg of triphenylcarbenium tetrakis(pentafluorophenyl)borate were dissolved in 20 ml of toluene. The solution thus obtained was added to the suspension obtained in (a) and the toluene was evaporated under vacuum.

(c) Polymerisation of propylene:

1 ml of a triethylaluminium solution (1M), 4 ml of a solution of 20.1 mg of ethylenebis(indenyl)dichlorozirconium in 25 ml of toluene and 2 liters of liquid propylene were introduced into a three-liter reactor equipped with a stirrer. 432 mg of the solid obtained in (b) were added thereto. The temperature was brought to 50° C. After 60 minutes, the reactor was cooled and degassed. 33.5 g of polypropylene were collected.

I claim:

1. A process for the preparation of a catalytic system, comprising:

preparing a mixture of at least one organoaluminium compound of general formula AlTT'T", in which T, T' and T" each denote a radical containing carbon and hydrogen and which may comprise oxygen, and at least one neutral metallocene selected from compounds of formula $(C_p)_a(C_p')_b MX_x Z_z$, in which:

$C_p$ denotes an unsaturated hydrocarbon radical coordinated to the central atom M $C_p'$ denotes an unsaturated hydrocarbon radical coordinated to the central atom M, or a radical derived from an element chosen from groups VA and VIA of the Periodic Table, the groups $C_p$ and $C_p'$ being identical or different, and being able to be linked via a covalent bridge M denotes a transition metal chosen from groups IIIB, IVB, VB and VIB of the Periodic Table a, b, x and z denote integers such that (a+b+x+z)=m, $x \geq 1$, $z > 0$ and a and/or $b \neq 0$ m denotes the valency of the transition metal M X denotes a halogen Z denotes a hydrocarbon radical or a silyl radical of formula ($-R_t-Si-R'R''R'''$), where R denotes an optionally substituted alkyl, alkenyl, aryl, alkoxy or cycloalkyl group R', R" and R'" are identical or different and each denote a halogen or an optionally substituted alkyl, alkenyl, aryl, alkoxy or cycloalkyl group t denotes 0 or 1 in at least one hydrocarbon diluent and, in a second stage, adding an ionising agent thereto such that a molar ratio of said ionising agent to said neutral metallocene is at least 0.1 and less than 2.

2. The process according to claim 1, wherein the unsaturated hydrocarbon radicals are selected from the group consisting of cyclopentadienyl, indenyl and fluorenyl unsubstituted or substituted by a hydrocarbon radical containing up to 10 carbon atoms or a radical formed from an element selected from Group VA or Group VIA of the Periodic Table.

3. The process according to claim 1, wherein the transition metal is zirconium.

4. The process according to claim 1, wherein the neutral metallocene is in the form of a solution in an aromatic hydrocarbon.

5. The process according to claim 1, wherein the ionising agent is in the form of a solution in an aromatic hydrocarbon.

6. The process according to claim 4, wherein the aromatic hydrocarbon is toluene.

7. The process according to claim 1, wherein the ionising agent is selected from triphenylcarbenium tetrakis(pentafluorophenyl)borate and tri(pentafluorophenyl)borane.

8. The process according to claim 1, wherein the organoaluminium compound is selected from the group consisting of triethylaluminium and triisobutylaluminium.

9. The process according to claim 1, wherein Z is a silyl radical of formula ($-R_t-Si-R'R''R'''$) and the neutral metallocene is prepared by reacting a compound of formula $(C_p)_a(C_p')_b MX_x H_z$ with a silane.

10. The process according to claim 9, wherein the silane is chosen from nonhalogenated alkenylsilanes comprising up to 60 carbon atoms.

11. The process according to claim 10, wherein the silane is vinyl(trimethoxy)silane.

12. The process according to claim 1, wherein Z is a hydrocarbon radical and the neutral metallocene is prepared by reacting a compound of formula $(C_p)_a(C_p')_b MX_x H_z$ with an olefin.

13. The process according to claim 12, wherein olefin is ethylene.

14. The process according to claim 1, including depositing the neutral metallocene and/or the ionising agent on a support.

15. The process according to claim 14, wherein the support is an inorganic support.

16. The process according to claim 15, wherein the support is selected from the group consisting of silica, alumina and magnesium chloride.

17. A Process according to claim 5, wherein the aromatic hydrocarbon is toluene.

18. A process for the preparation of a catalytic system free from alumoxane, comprising:

preparing a mixture of at least one organoaluminium compound of general formula AlTT'T", in which T, T' and T" each denote a radical containing carbon and hydrogen and which may comprise oxygen, and at least one neutral metallocene selected from compounds of formula $(C_p)_a(C_p')_b MX_x Z_z$, in which:

$C_p$ denotes an unsaturated hydrocarbon radical coordinated to the central atom M $C_p'$ denotes an unsaturated hydrocarbon radical coordinated to the central atom M, or a radical derived from an element chosen from groups VA and VIA of the Periodic Table, the groups $C_p$ and $C_p'$ being identical or different, and being able to be linked via a covalent bridge M denotes a transition metal chosen from groups IIIB, IVB, VB and VIB of the Periodic Table a, b, x and z denote integers such that (a+b+x+z)=m, $x \geq 1$, $z > 0$ and a and/or $b \neq 0$ m denotes the valency of the transition metal M X denotes a halogen Z denotes a hydrocarbon radical or a silyl radical of formula ($-R_t-Si-R'R''R'''$), where R denotes an alkyl, alkenyl, aryl, alkoxy or cycloalkyl group R', R" and R'" are identical or different and each denote a halogen or an alkyl, alkenyl, aryl, alkoxy or cycloalkyl group t denotes 0 or 1 in at least one hydrocarbon diluent and, in a second stage, adding an ionising agent thereto such that a molar ratio of said ionising agent to said neutral metallocene is at least 0.1 and less than 2, to form a catalytic system free from alumoxane.

19. A process for the preparation of a catalyst system, comprising:

preparing a mixture of at least one organoaluminium compound of general formula AlTT'T", in which T, T' and T" each denote a radical containing carbon and hydrogen and which may comprise oxygen, and at least one neutral metallocene selected from compounds of formula $(C_p)_a(C_p')_b MX_x Z_z$, in which:

$C_p$ denotes an unsaturated hydrocarbon radical coorindated to the central atom M $C_p'$ denotes an unsaturated hydrocarbon radical coordinated to the central atom M, or a radical derived from an element chosen from groups VA and VIA of the Periodic Table, the groups $C_p$ and $C_p'$ being identical or different, and being able to be linked via a covalent bridge M denotes a transition metal chosen from groups IIIB, IVB, VB and VIB of the Periodic Table a, b, x and z denote integers such that (a+b+x+z)=m, $x \geq 1$, $z \geq 0$ and a and/or $b \neq 0$ m denotes the valency of the transition metal M X denotes a halogen Z denotes a radical containing carbon and hydrogen and which may comprise oxygen or a silyl radical of formula ($-R_t Si-R'R''R'''$), where R denotes an optionally substituted alkyl, alkenyl, aryl, alkoxy or cycloalkyl group R', R" and R"' are identical or different and each denote a halogen or an optionally substituted alkyl, alkenyl, aryl, alkoxy or cycloalkyl group t denotes 0 or 1 in at least one hydrocarbon diluent, adding an ionising agent thereto such that a molar ratio of said ionising agent to said neutral metallocene is at least 0.1 and less than 2, said process including depositing the neutral metallocene and/or the ionising agent on a support.

* * * * *

UNITED STATES PATENT AND TRADEMARK OFFICE
CERTIFICATE OF CORRECTION

PATENT NO. : 5,612,271
DATED : March 18, 1997
INVENTOR(S) : Nicola Zandona

It is certified that error appears in the above-indentified patent and that said Letters Patent is hereby corrected as shown below:

On the title page, and column 1, change the title to read -- PROCESS FOR THE PREPARATION OF A CATALYTIC SYSTEM, PROCESS FOR THE (CO)POLYMERIZATION OF OLEFINS AND (CO)POLYMERS OF AT LEAST ONE OLEFIN -- .

Signed and Sealed this

Twenty-second Day of July, 1997

*Attest:*

*Attesting Officer*

BRUCE LEHMAN

*Commissioner of Patents and Trademarks*